Jan. 29, 1957   S. J. SPIECE   2,779,879
CAPACITOR HOUSING
Filed Nov. 4, 1955   4 Sheets-Sheet 1
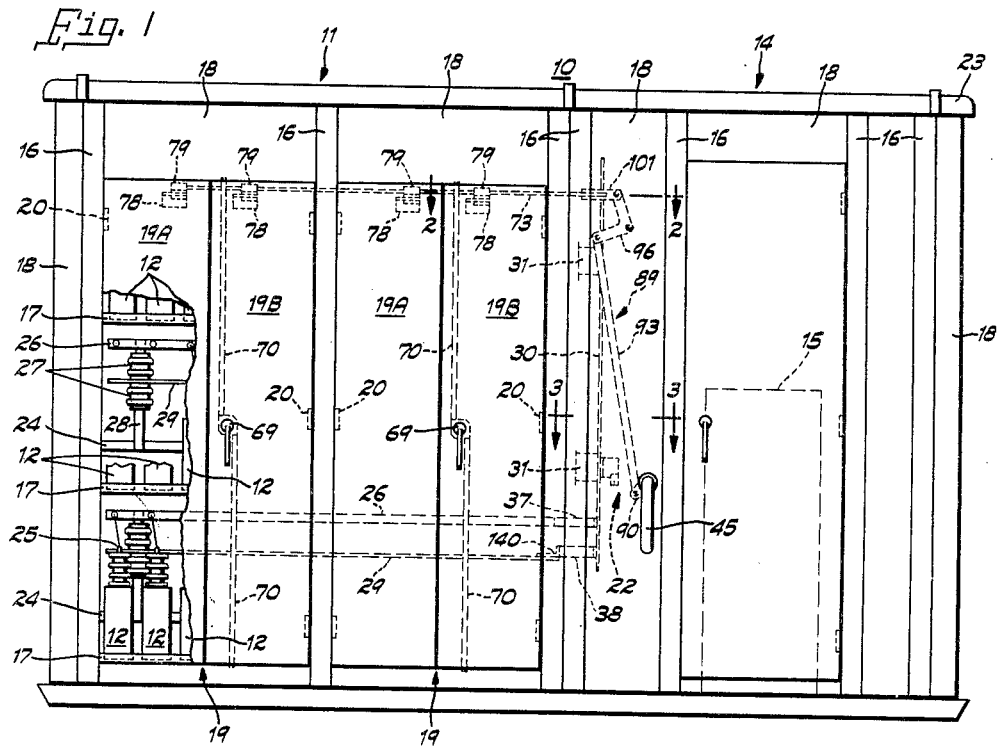
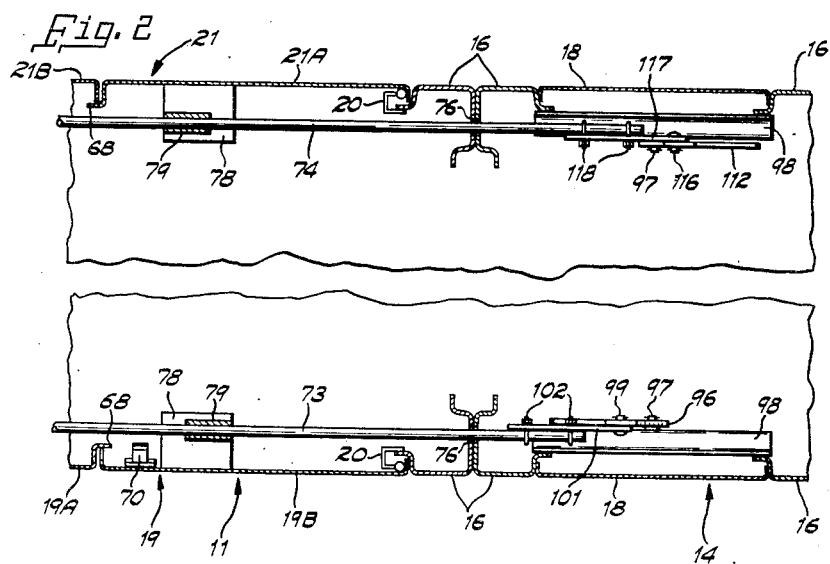
INVENTOR.
Stanley J. Spiece
BY Lee R. Keiser
Attorney INVENTOR.
Stanley J. Spiece
BY
Lee H. Kaiser
Attorney

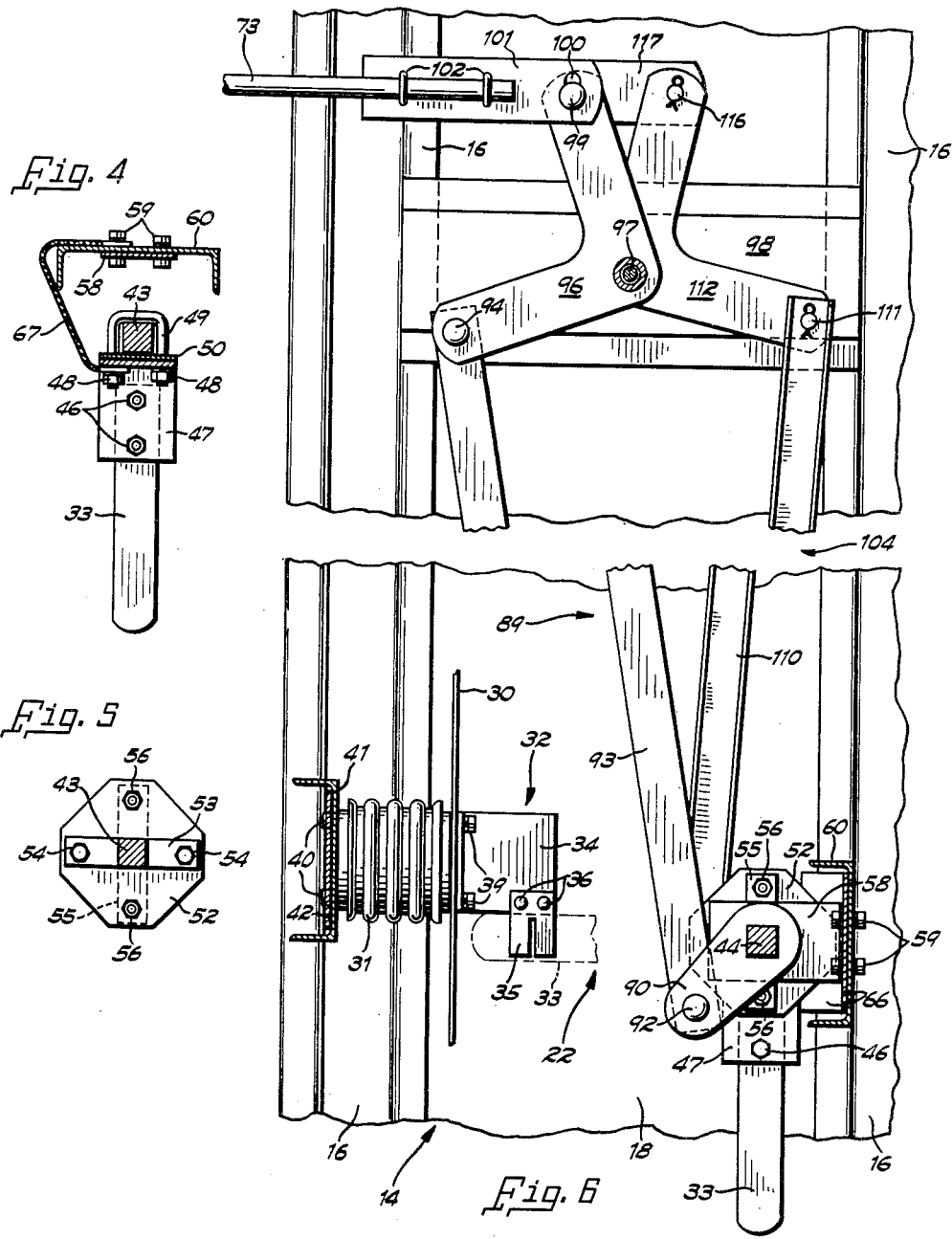

Jan. 29, 1957  S. J. SPIECE  2,779,879
CAPACITOR HOUSING

Filed Nov. 4, 1955  4 Sheets-Sheet 4

INVENTOR.
Stanley J. Spiece
BY Lee H. Kaiser
Attorney

United States Patent Office 2,779,879
Patented Jan. 29, 1957

2,779,879

CAPACITOR HOUSING

Stanley J. Spiece, Milwaukee, Wis., assignor to McGraw Electric Company, Milwaukee, Wis., a corporation of Delaware Application November 4, 1955, Serial No. 545,090

4 Claims. (Cl. 307—94)

This invention relates to housing for electrical apparatus and in particular to interlocks for the doors which permit access to electrical apparatus within the housing.

Capacitors are frequently connected in shunt to alternating current transmission and distribution lines to improve factor and to relieve the system from carrying at least a part of the reactive requirements of the load, i. e., to relieve the line and source equipment of wattless current, and in many installations a plurality of capacitor units are enclosed in a suitable housing and connected together by buses into a bank which is switched onto and off the system by a circuit breaker. When the bank is disconnected from the line by the circuit breaker, the residual charge on the capacitors due to the storage of energy, as well as the voltage on the capacitor terminals and buses, is often sufficiently high to be dangerous to life. To protect personnel a grounding switch is conventionally provided to short circuit and ground the capacitors and buses so that they may be safely handled for installation and maintenance work.

It is an object of the invention to provide an improved interlock for the doors of an electrical apparatus housing.

It is a further object of the invention to provide, in a capacitor housing having a grounding switch and doors permitting access to the capacitors, means to interlock the doors and the grounding switch so that the doors cannot be opened when the grounding switch is in open position and the switch cannot be moved from grounding position to open position when any door is open.

Other objects and advantages of the invention will be apparent from the following detailed description when taken in conjunction with the accompanying drawing wherein:

Fig. 1 is a front elevation view of a capacitor housing embodying the invention with a part of a door broken away to show the capacitors within the housing;

Fig. 2 is a horizontal sectional view taken on line 2—2 of Fig. 1;

Figure 3:
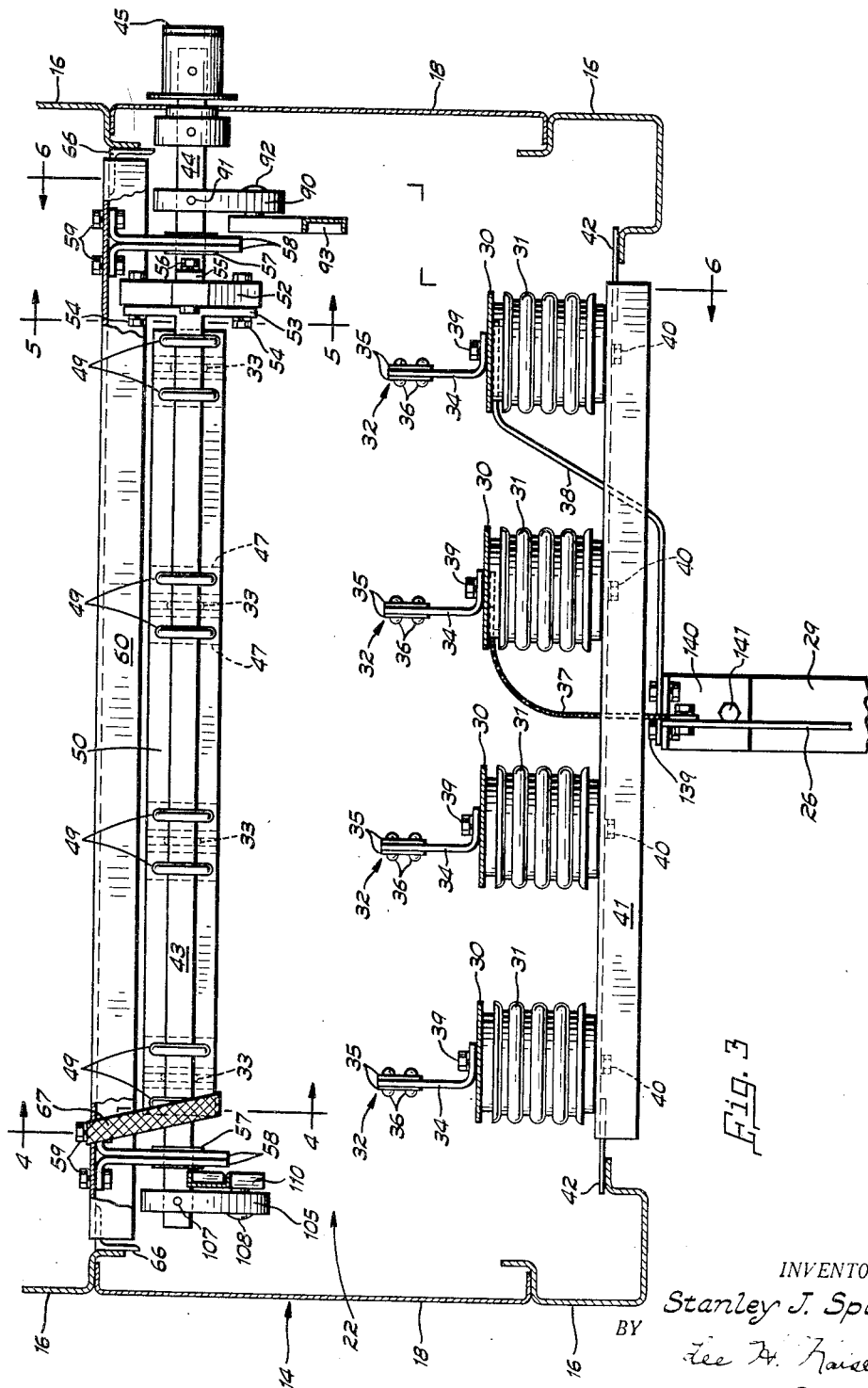
Fig. 3 is a horizontal sectional view taken on line 3—3 of Fig. 1 showing the grounding switch assembly.
Figure 7:
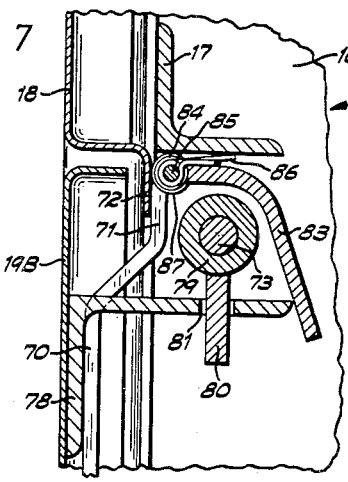
Figure 8:
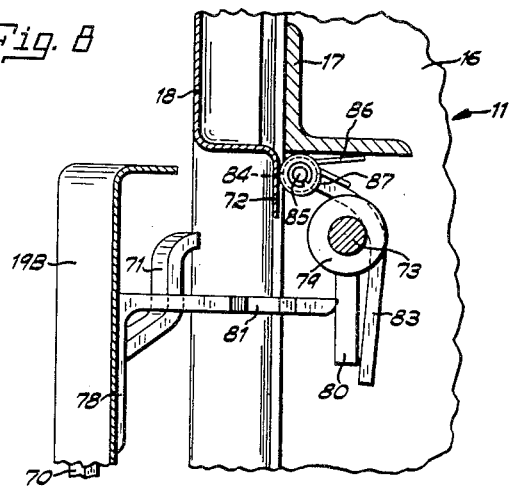
Figure 9:
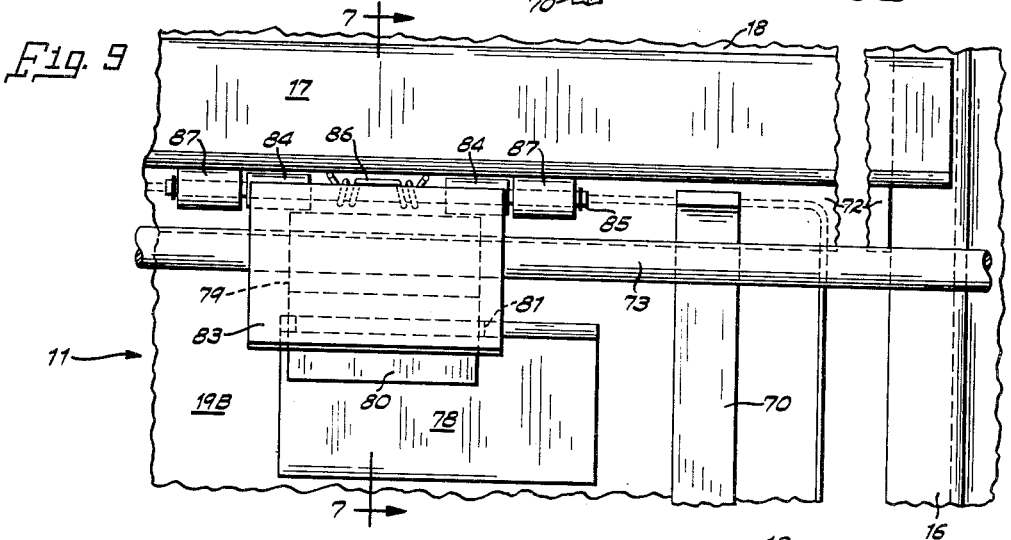
Figure 10:
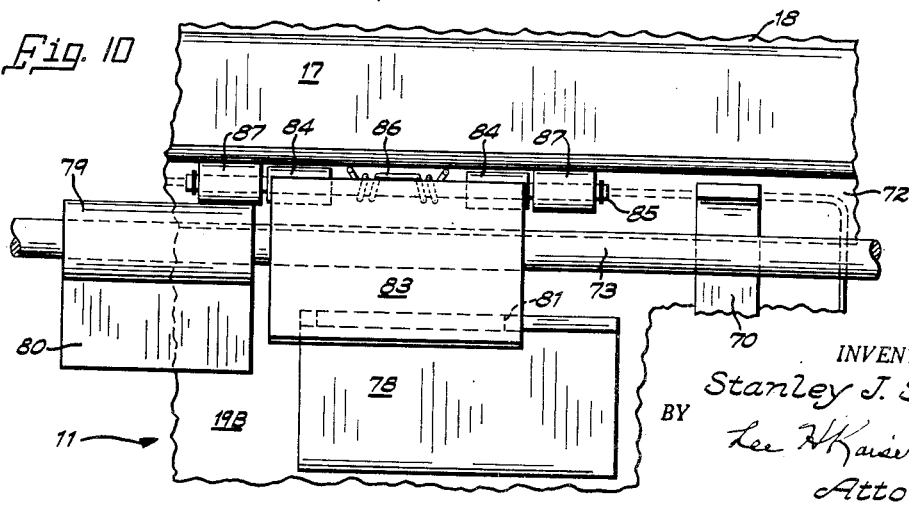

Figs. 4 and 5 are fragmentary detail views taken on lines 4—4 and 5—5 respectively of Fig. 3;

Fig. 6 is a vertical section view of the linkage interconnecting the grounding switch and the door interlock, taken approximately on line 6—6 of Fig. 3;

Figs. 7 and 8 are vertical sectional views through the interlocking means, taken approximately on line 7—7 of Fig. 9, showing the interlocking means with the housing doors closed and open respectively; and Figs. 9 and 10 are views taken from inside the housing looking toward the interlocking means, showing the interlock when the grounding switch is in open and closed positions respectively.

Referring to the drawing, Fig. 1 shows a capacitor bank housing 10 of the metal enclosed type which is suitable for outdoor service. The housing 10 has a capacitor cubicle 11 providing a compartment in which capacitor units 12 are enclosed and a circuit breaker cubicle 14 which encloses a circuit breaker 15 for switching the capacitors onto and off the power system and may also contain other control and protective equipment. The capacitor and circuit breaker cubicles 11 and 14 respectively may be of any suitable construction, comprising, for example, vertical frame members 16 having a plurality of transverse frame members 17 at spaced intervals to provide a substantially rigid frame structure. Panel members 18 fastened to the vertical frame members 16 and to the transverse frame members 17, preferably by welding, provide walls for the cubicles 11 and 14. As illustrated two pairs of doors 19 mounted on suitable hinges 20 permit access from the front of the cubicle 11 to the capacitor units 12, and similarly two pairs of doors 21 (see Fig. 2) permit access to the capacitors 12 from the rear of cubicle 11. Any desired number of capacitor cubicles 11 may be disposed side by side to provide a capacitor bank having the required capacitive reactance and current, and the invention may be utilized to interlock the front doors 19 and the rear doors 21 of all the capacitor cubicles 11 with a grounding switch 22 positioned within circuit breaker cubicle 14. A roof member 23 of any suitable construction closes the top of the housing 10.

Certain of the horizontally extending transverse frame members 17 connecting the vertical frame members 16 provide support for the capacitor units 12. One end of each capacitor unit 12 rests upon a horizontal frame member 17, and a bracket (not shown) affixed to the opposite end of the capacitor casing is supported upon a channel member 24 extending across the capacitor cubicle 11 midway of the front and rear walls thereof and welded at its ends to transverse frame members (not shown). The capacitor units 12 are arranged in tiers, and in the polyphase capacitor bank illustrated in the drawing each tier comprises the capacitor units 12 adapted to be connected to one of the phases of a three phase electric system. One terminal 25 of each capacitor unit 12 is connected to one of three horizontally extending, copper "phase" buses 26 which extend across the cubicle 11 and are mounted on skirted insulators 27. The skirted insulators 27 are positioned one above the other in pairs and are mounted upon brackets 28 which are supported on channels 24. Three copper "neutral" bus bars 29 extending across the capacitor cubicle 11 connect the capacitor units 12 in Y. One neutral bus 29 is associated with each tier of capacitor units 12 and is supported between the skirted insulators 27. The second terminal (not shown) of each capacitor unit 12 is connected to a neutral bus bar 29. The horizontal phase bus bars 26 and the neutral bus bars 29 are electrically connected to vertical buses 30 which are supported on skirted insulators 31 within circuit breaker cubicle 14.

To discharge and short circuit the capacitor units 12 for protection of personnel, it is preferable to short circuit and ground the copper bus bars by means of the grounding switch 22 within circuit breaker cubicle 14. The grounding switch 22 as shown in detail in Figs. 3–6 includes four stationary contacts 32 each of which is adapted to receive one of four movable knife blade contacts 33 (best seen in Figs. 4 and 6) which depend vertically in the open position of the grounding switch 22. Each of the stationary contacts 32 includes an L-shaped member 34 of conducting material, preferably copper, having a pair of opposed leaf members 35, preferably of copper, rigidly secured thereto by rivets 36. Each L-shaped copper member 34 abuts against and is electrically connected to one of the vertical bus bars 30. As explained hereinbefore, the illustrated capacitor bank is intended for a polyphase installation, and three of the four vertical bus bars 30 are conventionally connected to individual ones of the phase bus bars 26, for example by flexible copper straps 37, only one being illustrated in Fig. 3. The three neutral buses 29 are electrically commoned by means not shown and connected to the fourth vertical bus 30 by a Z-shaped copper strap 38. The Z-shaped strap 38 is affixed at one end to the vertical bus 30 and is secured at the opposite end by bolts 139 to an L-shaped bracket 140 which is supported on a neutral bus bar 29 by bolts 141.

The L-shaped members 34 of the stationary contacts 32 are mounted by bolts 39 which extend through clearance holes in the vertical buses 30 and are threadably received within holes (not shown) provided in one end of skirted porcelain insulators 31. Bolts 40 received within threaded holes (not shown) in the opposite end of the insulators 31 support the insulators 31 on a channel member 41. Stub plates 42 affixed, preferably by welding, to the ends of channel 41 are welded to vertical frame members 16 of the housing 10.

The four movable knife blade contacts 33 are rigidly affixed to a square shaft 43 that is rigidly secured to, but insulated from, a square handle shaft 44 which extends through a panel 18 to a position exterior of circuit breaker cubicle 14 and carries a handle 45 permitting manual operation of the grounding switch 22. Each knife blade contact 33 is affixed by bolts 46 to a pair of L-shaped brackets 47 disposed on opposite sides thereof. Nuts 48 threadably engage U-bolts 49 which fit over shaft 43 and extend through clearance holes in both a conducting plate 50 and in the L-shaped brackets 47 to rigidly secure the brackets 47, and thus the movable contacts 33, to the shaft 43. The conducting plate 50 electrically commons the knife blade contacts 33.

A generally octagonal insulating member 52 insulates the shaft 43 from the handle shaft 44. The shaft 43 is T-shaped at one end, having a cross bar 53 integral therewith through which bolts 54 extend to rigidly secure shaft 43 to insulating member 52. The handle shaft 44 is also T-shaped at one end, having a cross bar 55 integral therewith affixed by bolts 56 to insulating member 52 in a position perpendicular to the cross bar portion 53 of shaft 43.

The aligned, rigidly connected shafts 43 and 44 are rotatably mounted within suitable bearings 57 which are supported upon horizontally extending L-shaped brackets 58 disposed back-to-back and secured by bolts 59 to a horizontally extending channel 60. Stub angle iron members 66 welded to the ends of the channel 60 and also to vertical frame members 16 support the grounding switch assembly 22 within the circuit breaker cubicle 14. A flexible conducting strap 67 secured at one end beneath a nut 48 (see Fig. 4) and at the opposite end beneath a bolt 59 electrically connects all of the movable knife blade contacts 33 to the framework of the housing 10, thereby grounding the movable contacts 33. It will be apparent that, inasmuch as all the knife blade contacts 33 are electrically commoned by shaft 43 and conducting plate 50 and electrically grounded by flexible strap 67, closure of grounding switch 22 will electrically common and connect to ground all the buses 26 and 29, and thus discharge and ground all the capacitor units 12 so that they may be safely handled by personnel for maintenance and repair work.

The words "left," "right," "clockwise" and "counterclockwise" are used throughout the description to connote directions as seen from the front of the housing 10, and it will be appreciated that the parts of Figs. 9 and 10, which are taken from inside the housing 10, will be shown in reverse thereto.

Means are provided to latch each pairs of doors 19 and 21 in closed position, but the latching means is independent of the locking means and does not constitute a part of the present invention. In each pair of doors 19 and 21, one of the doors is held in closed position by the other, e. g., left door 19A is provided with a flange 68 (see Fig. 2) which abuts against right door 19B and prevents opening of left door 19A when the right door 19B is closed. The right door 19B has a latching handle 69 and two vertical latching rods 70 connected to the handle 69. An offset portion 71 (see Figs. 7 and 8) is provided at the end of each latching rod 70, and when the handle 69 is turned one latching rod 70 moves upward and engages the offset portion 71 behind a depending flange 72 of a panel member 18 adjacent the top of the door 19B and simultaneously the second latching rod 70 moves downward and engages the offset portion 71 behind a similar flange (not shown) to latch the door 19B at the bottom. When the handle 69 is turned in the opposite direction, the latching rods 70 are moved to disengage the offset portions 71 and release the door 19B.

The details of the means for interlocking the doors 19 and 21 and the grounding switch 22 are shown in Figs. 6 through 10. An elongated rod 73 extends horizontally through all of the capacitor cubicles 11 adjacent the top of the doors 19 at the front of the cubicle 11 and into the circuit breaker cubicle 14, and similarly an elongated rod 74 extends horizontally through all of the capacitor cubicles 11 adjacent the top of the doors 21 at the rear of the cubicle 11 and into the circuit breaker cubicle 14. The means for interlocking all of the doors 19 and 21 are substantially identical and only the interlock for one pair of doors 19 associated with elongated rod 73 will be described. Elongated rod 73 extends through clearance holes 76 in certain of the vertical frame members 16 and is axially reciprocable. A pair of cooperable locking elements 78 and 79 associated with each door 19 are engageable to lock the door, the first element 78 comprising an angle iron member secured, preferably by welding, to the inner surface of the door 19 adjacent the top thereof and the second locking element comprising a cylindrical member 79 affixed to the elongated rod 73 and having a depending tongue 80. The locking member 78 secured to door 19 has a slot 81 therein adapted to receive the tongue 80 on the locking element 79 when the door 19 is closed. The elongated rod 73 is movable from a position shown in Fig. 9 wherein the tongue 80 is within the slot 81 and prevents the door 19 from being opened, to a position shown in Fig. 10 where the tongue 80 is free of the slot 81 and the door 19 is released and can be opened. The rod 73 carries a locking element 79 for door 19A and a separate locking element 79 for door 19B.

Stop members 83 prevent axial movement of rod 73 if any door 19 is open. Each stop 83 has spaced apart tubular portions 84 (see Figs. 9 and 10) integral therewith which accommodates a hinge pin 85. The ends of hinge pin 85 extend into sleeve portions 87 secured to a transverse, angle iron frame member 17 to pivotally support the stop 83. One end of a resilient spring 86 circumjacent the hinge pin 85 bears against the frame member 17 and the opposite end bears against the stop 83 to urge the stop 83 into the path of movement of the cylindrical locking element 79 affixed to the elongated rod 73. When the door 19 is closed, the locking element 78 affixed to the door 19 holds the stop 83 in a position shown in Fig. 7 out of interfering relation with the cylindrical locking element 79, thereby permitting the elongated rod 73 to reciprocate freely in an axial direction. When the door 19 is open, the locking element 78 no longer contacts the stop member 83, and the spring 86 moves the stop member 83 to the position shown in Fig. 8 wherein the stop member 83 obstructs the locking element 79 and prevents movement of elongated rod 73 in an axial direction.

A linkage 89 connects the elongated rod 73 of the interlock to the grounding switch 22 to prevent opening the doors 19 when the grounding switch 22 is in open position and to prevent opening of the grounding switch 22 when any door 19 is open. A crank arm 90 circumjacent the square handle shaft 44 and affixed thereto by a pin 91 is pivotally connected by a pivot pin 92 to one end of a connecting rod 93. The opposite end of the connecting rod 93 is pivotally connected by a pivot pin 94 to one end of a bell crank lever 96 which is pivotally supported on a pin 97 extending through a plate 98 secured to vertical frame members 16, preferably by welding. A pivot pin 99 extending through an elongated slot 100 in a flat bar 101 pivotally connects the bar 101 to the other extremity of the bell crank lever 96. U-bolts 102 circumjacent the elongated rod 73 at one end thereof extend through the flat bar 101 and rigidly affix the elongated rod 73 thereto. It will be apparent that rotation of handle 45 to turn shaft 43 will be converted by linkage 89 comprising crank 90, connecting rod 93, and bell crank lever 96 into axial movement of elongated rod 73. Rotation of handle 45 clockwise to move knife blade contacts 33 to the closed, or grounding, position shown in dotted lines in Fig. 6, moves connecting rod 93 upward to pivot bell crank lever 96 clockwise and thus cause movement of elongated rod 73 to the right into the position shown in Fig. 10 where the tongue 80 on locking element 79 is withdrawn from the slot 81 in locking element 78, thereby permitting the doors 19 to be opened. If a door 19 is now opened, the stop 83 corresponding thereto is resiliently urged by spring 86 into the path of the cylindrical locking element 79, thereby obstructing movement of rod 73 to the left and preventing movement of grounding switch 22 from the closed, or grounding, position. When the doors 19 are closed the locking element 78 holds the stop 83 away from its interfering position with locking element 79, thereby permitting rotation of handle 45 in a counter-clockwise position to move the knife blade contacts 33 to the open position shown in solid lines in Fig. 6 and simultaneously rotating crank 90 counterclockwise to pull connecting rod 93 downward, to pivot bell crank lever 96 counterclockwise, and move elongated rod 73 to the left into the position shown in Figs. 7 and 10 wherein tongue 80 on locking element 79 is within slot 81 in locking element 78, thereby preventing opening of either door 19 when the grounding switch 22 is open.

In a similar manner the elongated rod 74 carrying the male locking element 79 for each of the doors 21 at the rear of the cubicle 11 is connected by a linkage 104 to the grounding switch 22. A crank 105 (see Fig. 3) circumjacent the square grounding switch shaft 43 and affixed thereto by a pin 107 is pivotally connected by a pivot pin 108 to one end of a connecting rod 110. The opposite end of connecting rod 110 is pivotally connected by a pivot pin 111 to one extremity of a bell crank lever 112 rotatably mounted about the pin 97. A pivot pin 116 extending through an elongated slot (not shown) in one end of a flat bar 117 pivotally connects the bar 117 to the other extremity of bell crank lever 112. U-bolts 118 (see Fig. 2) circumjacent elongated rod 74 extend through flat bar 117 and rigidly affix elongated rod 74 thereto. Rotation of handle 45 in a clockwise direction to move grounding switch 22 to closed, or grounding, position rotates bell crank lever 112 in the opposite direction (i. e., counterclockwise) from that in which bell crank lever 96 is rotated, and simultaneously moves elongated rod 74 to the left to unlock the doors 21 at the rear of cubicle 11 and moves elongated rod 73 to the right to unlock the doors 19 at the front of cubicle 11.

Although the interlock has been shown and described in combination with a grounding switch, the interlock of the invention is suitable for locking a plurality of doors of any housing. For example, in a housing not provided with a grounding switch, it is convenient to lock a plurality of doors by means in accordance with the invention and to secure the shaft which actuates the linkage against rotation, for example, by padlocking the shaft handle. In such an installation the stop members 83 insure that all doors are closed before the interlock handle can be actuated.

While only a single embodiment of the invention has been illustrated and described, it will be apparent that many variations and modifications thereof will be apparent to those skilled in the art, and it is intended in the appended claims to cover all such modifications and variations as fall within the true spirit and scope of the invention.

What I claim as new and desire to secure by Letters Patent of the United States is:

1. In a capacitor bank, in combination, a housing, a plurality of capacitors within the housing, the housing having a door to permit access to the capacitors, an axially reciprocable horizontal rod slidably supported within said housing adjacent said door, a pair of locking elements adapted to be engaged to lock said door, the first of said locking elements being affixed to said door and the second being carried by said rod, an electrical switch within the housing for grounding the capacitors, a linkage interconnecting the grounding switch and said rod, said switch having an open position and a grounding position and while in open position holding said rod through said linkage in a position wherein said locking elements are engaged and said door is locked, said switch being provided with a handle external of the housing to permit movement thereof to grounding position and the simultaneous movement of said rod through said linkage to a position wherein said locking elements are disengaged and said door is unlocked, a pivotably mounted stop, means resiliently urging said stop to a position wherein it obstructs and prevents movement of said rod, said first locking element holding said stop away from an interfering position with said rod when said door is closed, whereby when said door is closed said switch may be actuated by said handle to open position and said rod concurrently moved to the position wherein said locking elements are engaged and said door is locked, said first locking element being moved out of engagement with said stop when said door is opened, whereby said stop is urged by said resilient means into interfering position with said rod and said grounding switch cannot be opened as long as said door is open.

2. A housed capacitor assembly comprising, in combination, a housing, a plurality of capacitors within the housing, the housing having doors to permit access to the capacitors, electrically conductive buses within the housing, means for electrically connecting the capacitors to the buses, a grounding switch within the housing for grounding the buses, a movable rod extending through the housing adjacent said doors, a plurality of pairs of cooperable locking elements, the elements of each pair being engageable to lock one of said doors, the first element of each pair being carried by said one of said doors and the second element being carried by said rod, a linkage connecting the grounding switch to said rod, said grounding switch being movable between an open position and a grounding position and during such movement actuating said rod through said linkage between a first position wherein the locking elements of each pair are engaged and said doors are locked and a second position wherein the locking elements of each pair are disengaged and said doors are unlocked, a plurality of stops pivotally mounted on said housing, each stop being associated with one pair of locking elements and being resiliently urged to a position where it obstructs and prevents movement of said rod, said first locking element of each pair holding the associated stop away from its interfering position with said rod when the door carrying said first locking element is closed and being moved out of engagement with the associated stop when said door is opened, whereby when any door is open the associated stop prevents movement of said switch from grounding position.

3. In a housed capacitor assembly, in combination, a housing, a plurality of capacitors within the housing, the housing having a door to permit access to the capacitors, electrically conductive buses within the housing, means for electrically connecting the capacitors to the buses, an electrical switch for grounding the buses, a movable rod extending through said housing adjacent said door, a linkage connecting said switch and said rod, door locking means carried by said rod, said switch being movable between a grounding position and an open position and adapted during such movement to move said rod through said linkage between a first position wherein said locking means is free of said door and said door can be opened and a second position wherein said locking means engages said door and prevents it from opening, a movable stop member, resilient means urging said stop member to a position wherein it obstructs and prevents movement of said rod, and a member carried by said door adapted to hold said stop member away from its interfering position with said rod when said door is closed.

4. In a housing having a plurality of doors permitting access to the interior of the housing, an interlock for the doors of said housing comprising, in combination, a horizontal rod slidably supported within said housing adjacent said doors, a plurality of pairs of cooperable locking elements, the elements of each pair being engageable to lock one of said doors, the first element of each pair being carried by said one of said doors and the second element being carried by said rod, a rotatable shaft within said housing and extending to the exterior of said housing, a linkage connecting the shaft to said rod and adapted upon rotation of said shaft to actuate said rod in an axial direction, said shaft having a handle to permit rotation of said shaft and reciprocation of said rod through said linkage between a first position wherein the locking elements of each pair are engaged and said doors are locked and a second position wherein the locking elements of each pair are disengaged and said doors are unlocked, a plurality of stop members pivotally mounted on said housing, each stop member being resiliently urged to a position wherein it obstructs and prevents movement of said rod, said first locking element of each pair holding the associated stop member away from its interfering position with said rod when the door carrying said first locking element is closed and being moved out of engagement with the associated stop member when said door is opened, whereby said handle cannot be rotated to reciprocate said rod to said first position until all said doors are closed.

No references cited.